United States Patent

Junkers

Patent Number: 5,888,041

Date of Patent: *Mar. 30, 1999

[54] LOCK NUT

[76] Inventor: John K. Junkers, 333 Rte. 17 North, Mahwah, N.J. 07430

[*] Notice: The term of this patent shall not extend beyond the expiration date of Pat. No. 5,622,465.

[21] Appl. No.: 953,603

[22] Filed: Oct. 17, 1997

[51] Int. Cl.$^6$ ....................................................... F16B 37/08
[52] U.S. Cl. ............................ 411/432; 411/223; 411/917
[58] Field of Search ...................................... 411/429, 432, 411/431, 373, 223, 917

[56] References Cited

U.S. PATENT DOCUMENTS

| | | | |
|---|---|---|---|
| 4,693,655 | 9/1987 | Omori | 411/429 |
| 4,890,967 | 1/1990 | Rosenbaum | 411/431 |
| 5,137,408 | 8/1992 | Junkers | 411/432 |
| 5,318,397 | 6/1994 | Junkers | 411/432 |
| 5,364,213 | 11/1994 | Teramura | 70/232 |
| 5,539,970 | 7/1996 | Junkers | 411/432 |
| 5,622,465 | 4/1997 | Junkers | 411/432 |
| 5,640,749 | 6/1997 | Junkers | 411/223 |

Primary Examiner—Steven Meyers
Assistant Examiner—Stephen Grady
Attorney, Agent, or Firm—Michael J. Striker

[57] ABSTRACT

A lock nut for connecting a joint having a threaded connector has a first nut member which is engageable with a threaded connector and is axially displaceable, a second nut member which is engageable with the first nut member and is rotatable about an axis, a third nut member which is non-rotatably but axially displaceably connected with the first nut member and has a substantially smooth surface over which the second nut member moves during rotation, so that when the second nut member is rotated about the axis against the smooth surface of the third nut member, the first nut member is displaced axially to apply a load to the threaded connector and to tighten the lock nut, and a locking element which non-rotatably connects the first and second nut members with one another after tightening of the lock nut.

7 Claims, 1 Drawing Sheet

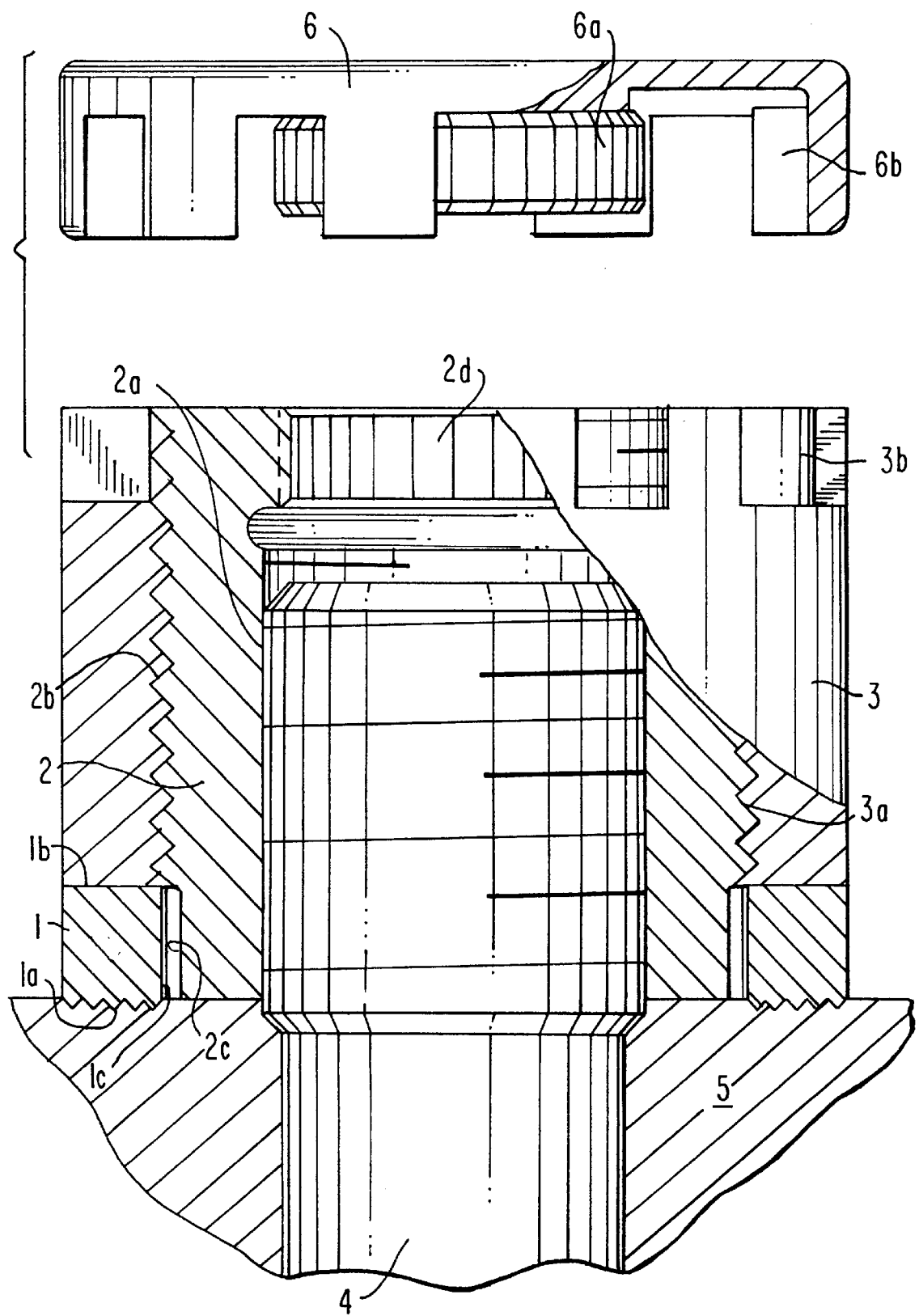

LOCK NUT

BACKGROUND OF THE INVENTION

The present invention generally relates to lock nuts.

Lock nuts are known in the art and widely utilized in industry. Some lock nuts require a firm connection of the nut with the bolt. Other lock nuts require a firm connection with the flange within which the bolt is screwed. Also, lock nuts that are provided with a two-piece washer slidable in one direction relative to one another and provided with rippled surfaces to abut against the flange surface on one side and against the nut bearing surface on the other side. Also, a lock nut is known which is designed so as to eliminate rotation of one of the nut members after tightening of the lock nut as disclosed in my U.S. Pat. No. 5,622,465. The above mentioned lock nut can be further improved.

SUMMARY OF THE INVENTION

Accordingly, it is an object of present invention to provide a lock nut which is a further improvement of existing lock nuts.

In keeping with these objects and with others which will become apparent hereinafter, one feature of the present invention resides, briefly stated, in a lock nut to connect a joint having a threaded connector, comprising a first nut member which is engageable with the threaded connector and is axially displaceable, a second member which is engageable with the first nut member and is rotatable about an axis, a third nut member which is connected non-rotatably but axially displaceably with the first nut member and which has one substantially smooth surface over which the second nut member moves during rotation, so that when the second nut member is turned about the axis against the surface of the third nut member, and the first nut member is displaced axially to apply a load to the threaded connector, and therefore the lock nut is sufficiently tightened, and locking means which eliminates rotation of the second nut member by non-rotatably connecting the first nut member with the second nut member.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single figure of the drawings is a view schematically showing a lock nut in accordance with the present invention.

DESCRIPTION OF PREFERRED EMBODIMENTS

A lock nut in accordance with the present invention shown in the drawing has a washer which is identified as a whole with reference numeral 1. The washer is ring-shaped and has a lower surface 1a which is substantially rough and an upper surface 1b which is substantially smooth. The surfaces 1a and 1b are spaced from one another in an axial direction. The washer further has an inner surface which has a polygonal formation formed for example by a plurality of inner splines 1c. The splines extend in an axial direction and are spaced from one another in a circumferential direction. The rough surface 1a can be made in many different ways, for example by a plurality of ripples. The washer 1 forms a third nut member.

The lock nut further has a first nut member identified as a whole with reference numeral 2. The first nut member 2 is formed as a sleeve. It has inner thread means 2a engageable with outer thread means of a threaded connector of a joint, for example a bolt 4. It also has outer thread means 2b. Furthermore, it is provided with a polygonal formation 2c which is engageable with the polygonal formation 1c of the third nut member 1, so that the third nut member 1 and the first nut member 2 are connected with one another non-rotatably by displaceably in an axial direction relative to one another. The polygonal formation 2c can be formed by a plurality of splines which extend in an axial direction and are spaced from one another in a circumferential direction. Finally, the first nut member 2 has another polygonal formation 2d provided in the upper part on its inner surface. This polygonal formation also can be formed by a plurality of splines which extend in an axial direction and are spaced from one another in a circumferential direction.

The lock nut further has a second nut member which is identified as a whole with reference numeral 3. The second nut member is formed as a sleeve. It has inner thread means 3a which is engageable with the outer thread means 2b of the inner nut member 2. It further has an additional polygonal formation 3b which can be formed by a plurality of castellations extending in an axial direction and spaced from one another in a circumferential direction.

The lock nut further has a locking element which is identified as a whole with reference numeral 6. The locking element 6 is formed as a cap and is provided with two groups of locking means. The locking means of the first group is formed as a polygonal formation including a plurality of splines 6a formed on an inner projection of the locking element 6 so as to extend in an axial direction and to be spaced from one another in a circumferential direction. The locking means of the second group include a polygonal formation formed by a plurality of castellations 6b provided on an inner surface of the locking element and spaced from one another in a circumferential direction.

The lock nut in accordance with the present invention operates in the following manner:

The lock nut including the first nut member 2, the second nut member 3 and the third nut member 1 is applied onto the threaded connector, in particular on the bolt 4 by screwing the first nut member 2 onto the bolt. Then, the castellations 3b of the second nut member 3 are engaged by a tool and the second nut member is turned around its axis, while the first nut member 2 is prevented from rotation by being held with a tool engaging in the splines 2d. During turning of the second nut member 3, it slides with its lower surface against the smooth surface 1b of the third nut member 1, the first nut member 2 is displaced axially upwardly and tightens the bolt 4, the lower rough surface 1a of the third nut member embeds in the upper surface of the other part of the joint, in particular a flange 5, and the third nut member 1 together with the first nut member 2 do not turn during this process. When the lock nut is sufficiently tightened, the tool is disengaged and the locking element 6 is fitted over the nut members, so that the castellations 6b of the locking element 6 engage with the castellations 3b of the second nut member 3, and the splines 6a of the locking element 6 engage with the splines 2d of the second nut member 2. As a result, all parts of the lock nut become non-rotatably connected with one another and the lock nut can not turn relative to the flange 5.

It will be understood that each of the elements described above, or two or more together, may also find a useful application in other types of constructions differing from the types described above.

While the invention has been illustrated and described as embodied in lock nut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

I claim:

1. A lock nut for connecting a joint having a threaded connector, comprising a first nut member which is engageable with a threaded connector and is axially displaceable; a second nut member which is engageable with said first nut member and is rotatable about an axis; a third nut member which is non-rotatably but axially displaceably connected with said first nut member and has a substantially smooth surface over which said second nut member moves during rotation, so that when said second nut member is rotated about the axis against the smooth surface of said third nut member, said first nut member is displaced axially to apply a load to the threaded connector and to tighten the lock nut; and locking means which non-rotatably connects said first nut member and said second nut member with one another after tightening the lock nut.

2. A lock nut as defined in claim 1, wherein said first nut member has a first polygonal nut formation and said second nut member has a second polygonal nut formation, said locking means including a locking member having a first polygonal locking formation engageable with said first polygonal nut formation and also a second polygonal locking formation engageable with said second nut formation, so as to prevent rotation between said first and second nut members.

3. A lock nut as defined in claim 2, wherein one of said first and second polygonal nut formations is formed by a plurality of splines, one of said first and second locking formation being formed also by a plurality of splines engageable with said first mentioned splines.

4. A lock nut as defined in claim 2, wherein one of said first and second polygonal nut formations is formed by a plurality of castellations, one of said first and second locking formation being formed also by a plurality of castellations engageable with said first mentioned castellations.

5. A lock nut as defined in claim 2, wherein one of said polygonal nut formations is formed by a plurality of splines while the other of said polygonal nut formations is formed by a plurality of castellations, one of said polygonal locking formations being formed by a plurality of splines engageable with said first-mentioned splines, while the other of said polygonal locking formations is formed by a plurality of castellations engageable with said first-mentioned castellations.

6. A lock nut as defined in claim 1, wherein said third nut member has another surface which is opposite to said first mentioned surface and is rough so as to be imbedable into a surface of the joint.

7. A lock nut as defined in claim 6, wherein said rough surface of said third nut member is provided with a plurality of ripples.

* * * * *